US009423522B2

(12) United States Patent
Muyzert et al.

(10) Patent No.: US 9,423,522 B2
(45) Date of Patent: Aug. 23, 2016

(54) COMMUNICATION SYSTEMS FOR WATER VEHICLES

(71) Applicant: WESTERNGECO L.L.C., Houston, TX (US)

(72) Inventors: Everhard Muyzert, Girton (GB); Kenneth E. Welker, Oslo (NO)

(73) Assignee: WESTERNGECO L.L.C., Houston, TX (US)

( * ) Notice: Subject to any disclaimer, the term of this patent is extended or adjusted under 35 U.S.C. 154(b) by 450 days.

(21) Appl. No.: 13/711,394

(22) Filed: Dec. 11, 2012

(65) Prior Publication Data

US 2014/0160886 A1   Jun. 12, 2014

(51) Int. Cl.
*G01V 1/38* (2006.01)
*H04B 11/00* (2006.01)
*H04B 13/02* (2006.01)

(52) U.S. Cl.
CPC ............ *G01V 1/3843* (2013.01); *G01V 1/3808* (2013.01); *G01V 1/3817* (2013.01); *H04B 11/00* (2013.01); *H04B 13/02* (2013.01)

(58) Field of Classification Search
CPC ..... G01V 1/38; G01V 1/3808; G01V 1/3817; G01V 1/3843; H04B 11/00; H04B 13/02
USPC ............................................ 367/15; 340/850
See application file for complete search history.

(56) References Cited

U.S. PATENT DOCUMENTS

| 5,351,218 | A | 9/1994 | Hatteland et al. |
| 5,488,920 | A | 2/1996 | Gjestrum |
| 5,844,159 | A | 12/1998 | Posseme et al. |
| 5,894,450 | A | 4/1999 | Schmidt et al. |
| 6,604,482 | B1 | 8/2003 | Martello |
| 6,684,160 | B1 | 1/2004 | Ozbek et al. |
| 7,184,366 | B1 | 2/2007 | Harrick et al. |
| 7,196,969 | B1 | 3/2007 | Karazincir |
| 7,280,919 | B2 | 10/2007 | Yomoda et al. |
| 7,371,136 | B2 | 5/2008 | Hine et al. |
| 7,383,151 | B2 | 6/2008 | Berg et al. |

(Continued)

FOREIGN PATENT DOCUMENTS

GB    2431546    4/2007

OTHER PUBLICATIONS

International Search Report and Written Opinion of PCT Application No. PCT/US2011/024859 (14-0401-PCT) dated Aug. 31, 2011: pp. 1-9.

(Continued)

*Primary Examiner* — Ian J Lobo
(74) *Attorney, Agent, or Firm* — Kevin B. McGoff

(57) ABSTRACT

Various technologies described herein are directed to a method that includes deploying a plurality of wave gliders in a seismic survey area, where the plurality of wave gliders has one or more seismic sensors coupled thereto for acquiring seismic data. The method may also include deploying at least one source vessel in the seismic survey area, where the at least one source vessel has one or more sources coupled thereto and a central communication unit disposed thereon. The method may then include positioning the plurality of wave gliders according to an initial navigation plan. The method may further include monitoring a relative position of a respective wave glider in the plurality of wave gliders with respect to other wave gliders in the plurality of wave gliders and with respect to the at least one source vessel.

21 Claims, 7 Drawing Sheets

(56) References Cited

U.S. PATENT DOCUMENTS

| | | |
|---|---|---|
| 7,400,552 B2 | 7/2008 | Moldoveanu et al. |
| 7,415,936 B2 | 8/2008 | Storteig et al. |
| 7,426,439 B2 | 9/2008 | Ozdemir et al. |
| 7,466,625 B2 | 12/2008 | Robertsson |
| 7,660,695 B2 | 2/2010 | Berg et al. |
| 8,104,346 B2 | 1/2012 | Paulson |
| 8,351,293 B2 | 1/2013 | Frivik |
| 2005/0280421 A1 | 12/2005 | Yomoda et al. |
| 2006/0246654 A1 | 11/2006 | Shin |
| 2006/0286931 A1 | 12/2006 | Rhodes et al. |
| 2007/0025182 A1 | 2/2007 | Robertsson |
| 2007/0223306 A1* | 9/2007 | Toennessen ............ 367/15 |
| 2008/0008037 A1 | 1/2008 | Welker |
| 2008/0122716 A1 | 5/2008 | Berg et al. |
| 2008/0144442 A1 | 6/2008 | Combee et al. |
| 2008/0186804 A1 | 8/2008 | Amundsen et al. |
| 2008/0267010 A1 | 10/2008 | Moldoveau et al. |
| 2009/0003132 A1 | 1/2009 | Vassallo et al. |
| 2009/0122641 A1 | 5/2009 | Hillesund et al. |
| 2009/0141587 A1 | 6/2009 | Welker et al. |
| 2009/0157242 A1 | 6/2009 | Holo et al. |
| 2011/0158044 A1 | 6/2011 | Moldoveanu et al. |
| 2011/0177779 A1 | 7/2011 | Rhodes et al. |
| 2011/0199863 A1 | 8/2011 | Frivik |
| 2011/0266086 A1* | 11/2011 | Welker et al. ............ 181/122 |
| 2013/0081564 A1* | 4/2013 | Brizard et al. ............ 114/259 |

OTHER PUBLICATIONS

International Search Report and Written Opinion of PCT Application No. PCT/US2013/073369 dated Mar. 11, 2014: pp. 1-16.

Chandrasekhar, et al., "Localization in underwater sensor networks—Survey and challenges", Sep. 25, 2006, Proceedings of the First ACM International Workshop on Underwater Networks, 8 pages.

Jun-Hong, et al., "Challenges: Building Scalable and Distributed Underwater Wireless Sensor Networks (UWSNs) for Aquatic Applications", Sep. 30, 2005, http://www.cse.uconn.edu/'jcui/UWSN_papers/UCONN_CSE_UbiNet-TR05-02.pdf, 17 pages.

European Search Report issued in related EP application 13861611.5 on Feb. 22, 2016, 8 pages.

Mandar Chitre et al "Underwater Acoustic Communications and Networking: Recent Advances and Future challenges", Marine Technology Society Journal, vol. 42, No. 1, Jun. 20, 2008, pp. 103-116.

EP communication Article 94(3) EPC received in the corresponding EP Application 13861611.5, mailed Jun. 21, 2016.

EP Search Report received in the corresponding EP Application 13861611.5, mailed Jun. 3, 2016.

Mandar Chitre et al. "Underwater Acoustic Communications and Networking: Recent Advances and Future Challenges", Marine Technology Society Journal, vol. 42, No. 1, Jun. 20, 2008, pp. 103-116.

* cited by examiner

COMMUNICATION SYSTEMS FOR WATER VEHICLES

BACKGROUND

The following descriptions and examples do not constitute an admission as prior art by virtue of their inclusion within this section.

Seismic exploration involves surveying subterranean geological formations for hydrocarbon deposits. A seismic survey may involve deploying seismic source(s) and seismic sensors at predetermined locations. The sources generate seismic waves, which propagate into the geological formations, creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy one type of sensors or both. In response to the detected seismic events, the sensors generate electrical signals to produce seismic data. Analysis of the seismic data can then indicate the presence or absence of probable locations of hydrocarbon deposits.

Marine surveys may be performed in various marine environments. In one marine survey, water vehicles, such as autonomously operated vehicles (AOVs) or remotely operated vehicles (ROVs), may be used to gather seismic data from one or more seismic sensors. The AOVs or ROVs may transmit the seismic data to another location for processing using a communication link, such as a satellite link. Transmitting seismic data using satellite links may result in higher expenses and lower available bandwidth when compared with transmitting seismic data via other forms of communication links.

SUMMARY

Described herein are implementations of various technologies for a method of performing a seismic survey. In one implementation, the method includes deploying a plurality of wave gliders in a seismic survey area, where the plurality of wave gliders has one or more seismic sensors coupled thereto for acquiring seismic data. The method may also include deploying at least one source vessel in the seismic survey area, where the at least one source vessel has one or more sources coupled thereto and a central communication unit disposed thereon. The method may then include positioning the plurality of wave gliders according to an initial navigation plan. The method may further include monitoring a relative position of a respective wave glider in the plurality of wave gliders with respect to other wave gliders in the plurality of wave gliders and with respect to the at least one source vessel.

In another implementation, the method includes deploying a plurality of unmanned water vehicles in a seismic survey area, where a first unmanned water vehicle of the plurality of unmanned water vehicles includes one or more seismic sensors for acquiring seismic data. The method may then include communicably coupling the first unmanned water vehicle to one or more remaining unmanned water vehicles of the plurality of unmanned water vehicles using a first communication system. The method may also include communicably coupling a central communication unit disposed on a source vessel to the plurality of unmanned water vehicles using a second communication system, where the second communication system has a greater range than the first communication system.

In yet another implementation, the method that includes deploying a plurality of unmanned water vehicles in a seismic survey area, where the plurality of unmanned water vehicles has one or more seismic sensors coupled thereto for acquiring seismic data. The method may also include deploying at least one vessel in the seismic survey area, where the at least one vessel has a central communication unit disposed thereon. The method may then include sending command data to a first unmanned water vehicle of the plurality of unmanned water vehicles from the central communication unit. The method may further include sending the command data from the first unmanned water vehicle to a second unmanned water vehicle of the plurality of unmanned water vehicles by relaying the command data through one or more of the plurality of unmanned water vehicles disposed between the first unmanned water vehicle and the second unmanned water vehicle, where the second unmanned water vehicle is outside of a communication range of the central communication unit.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
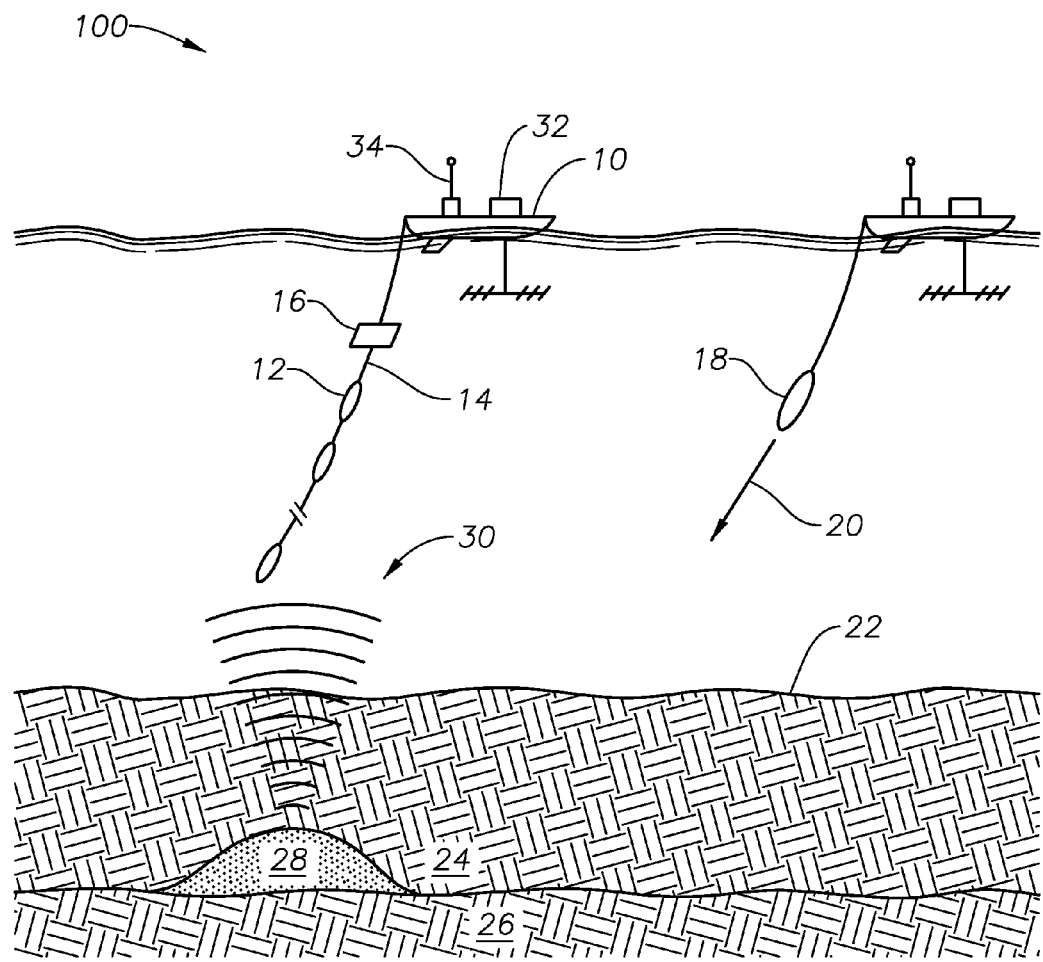
FIG. 1 illustrates a schematic diagram of a marine-based seismic acquisition system in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The following paragraphs provide a brief summary of various technologies and techniques directed at using communication systems for water vehicles described herein.

In one implementation, a first water vehicle of a plurality of water vehicles may acquire and store seismic data. The first water vehicle may include a wave glider. A first communication system may communicably couple the first water vehicle to one or more water vehicles of the plurality of water vehicles. In one implementation, the first communication system may be implemented using Wi-Fi technology. A second communication system may communicably couple a central communication unit to the plurality of water vehicles. In one implementation, the central communication unit may be located on a seismic source vessel, a service vessel, a platform, a land-based location or combinations thereof. In another implementation, the second communication system may be implemented using a satellite network.

The first water vehicle may use the first communication system to send the seismic data to a second water vehicle of the plurality of water vehicles. Alternatively, the first water vehicle may send the seismic data to the second water vehicle by relaying the seismic data through one or more water vehicles of the plurality of water vehicles. In one implementation, the second water vehicle may store the seismic data as backup for the first water vehicle.

In another implementation, the first water vehicle may send the seismic data to the central communication unit via the first communication system when the central communication unit is within range of the first communication system. For instance, the first water vehicle may send support data to the central communication unit via the first communication system. In another instance, the central communication unit may send command data to the first water vehicle via the first communication system.

In one implementation, the first water vehicle may send support data to, and may receive command data from, the central communication unit via the second communication system. In a further implementation, the first water vehicle may send the support data to, and may receive command data from, the central communication unit via the second communication system by relaying the data through one or more water vehicles of the plurality of water vehicles.

One or more implementations of various techniques for using communication systems for water vehicles will now be described in more detail with reference to FIGS. 1-7 and in the following paragraphs.

Seismic Acquisition Using Water Vehicles

FIG. 1 illustrates a schematic diagram of a marine-based seismic acquisition system 100 in accordance with implementations of various techniques described herein. In one implementation, system 100 may include one or more water vehicles 10, where the water vehicle 10 may take the form of an autonomously operating vehicle (AOV) or a remotely operating vehicle (ROV). The water vehicle 10 may be adapted to descend through the water column or may be adapted for use on the sea surface. In one implementation, the water vehicle may be unmanned. For example, the water vehicle 10 may take the form of a wave glider, such as the wave glider described in U.S. Pat. No. 7,371,136, which is incorporated herein by reference. The water vehicle 10 may be powered by a battery, which may be recharged by solar panels disposed on the top of the water vehicle 10.

The water vehicle 10 may be used for seismic surveying and may include one or more sensors 12. The sensors 12 may be attached directly onto a side of the water vehicle 10, disposed on an ocean bottom cable attached to the water vehicle 10, disposed on one or more streamers 14 attached to the water vehicle 10, or combinations thereof. The streamer 14 may descend in a substantially vertical manner from the water vehicle 10 into the water column, may be substantially horizontal within the water column or may take on a slanted or undulating configuration. The streamer 14 may be arranged in a spread in which multiple streamers 14 are towed in approximately the same plane at the same depth. Alternatively, the streamers 14 may be towed at multiple depths, such as in an over/under configuration. In one implementation, the streamer 14 may be a ministreamer.

The seismic sensors 12 may be pressure sensors, particle motion sensors, or may be multi-component seismic sensors. For the case of multi-component seismic sensors, the seismic sensors 12 are capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components) of a particle velocity and one or more components of a particle acceleration.

The multi-component seismic sensors may include one or more geophones, hydrophones, particle displacement sensors, optical sensors, particle velocity sensors, accelerometers, pressure gradient sensors or combinations thereof. For example, a particular multi-component seismic sensor may include three orthogonally-aligned accelerometers (e.g., a three-component micro electro-mechanical system (MEMS)

accelerometer) to measure three corresponding orthogonal components of particle velocity and/or acceleration near the seismic sensor. In such implementations, the MEMS-based sensor may be a capacitive MEMS-based sensor of the type described in co-pending U.S. patent application Ser. No. 12/268,064, which is incorporated herein by reference. In some implementations, a hydrophone for measuring pressure may also be used with the three-component MEMS described herein.

The multi-component seismic sensor may be implemented as a single device or may be implemented as a plurality of devices. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

In one implementation, the water vehicle 10 may be deployed to a desired position for seismic surveying. Where the water vehicle 10 takes the form of an AOV, the water vehicle 10 may be deployed to positions specified by a navigation plan, and the water vehicle 10 may automatically make corrections if the water vehicle 10 veers off-course. Where the water vehicle 10 takes the form of a ROV, the water vehicle 10 may be deployed to a desired position using remote operation of the water vehicle's rudder.

After deploying the water vehicle 10 to the desired position, a seismic source 18 may be detonated to generate acoustic waves 20 that propagate through an ocean bottom surface 22 and into strata 24, 26 beneath the ocean bottom surface. The seismic source 18 may be located on another water vehicle 10, as shown in FIG. 1, or more conventional source deployments may be used, such as the use of dedicated source vessels. The seismic source 18 may be a conventional air gun, marine vibrator or non-traditional environmentally friendly source. The seismic source may also include drilling induced acoustic pressure waves, passive seismic noise, or production induced acoustic pressure waves, such as those which may result from water or gas injections, or combinations thereof.

The acoustic signals 20 may be reflected from various subterranean geological formations, such as formation 28 depicted in FIG. 1. The incident acoustic signals 20 produce corresponding reflected acoustic signals, or pressure waves 30, which are sensed by the seismic sensors 12. In one implementation, the water vehicle 10 may record seismic data from over one hundred seismic sensors.

The seismic sensors 12 generate signals called "traces," which indicate the acquired measurements of the pressure wavefield and particle motion if the sensors include particle motion sensors. The traces are recorded and may be passed to a data acquisition system 32 disposed on the water vehicle 10. The data acquisition system 32 may include a digitizer, a computer system, and a storage system for storing seismic data acquired during the survey. The storage system may include memory, such as in the form of a hard disk drive. The seismic data may be recorded continuously over days or months at a time. Alternatively, the seismic data may be recorded intermittently, such as after each detonation of the seismic source 18.

The water vehicle 10 may include devices for measuring or recording support data. For example, support data may include system data, such as state of the battery, computer health checks or combinations thereof. In some instances, the support data may be of a smaller data volume than the seismic data. Support data may further include environmental data from collection units, such as Acoustic Doppler Current Profilers (ADCPs), bathymetric measurement units, marine mammal detection units or combinations thereof. Support data may also include quality control (QC) data derived from the seismic data, such as the root-mean-square (RMS) energy of each seismic trace of a specified time and frequency. In some instances, the QC data may include QC values calculated for each sensor, where the QC values may also be averaged and compressed into a single bit. The QC data may be used to determine whether the acquired seismic data is acceptable.

Support data may additionally include positional data of the water vehicle 10. The positional data may include geographical coordinates, Global Positioning System (GPS) positions, or any other implementation known to those skilled in the art. The positional data may be determined from a Global Navigation Satellite System (GNSS) (e.g., GPS owned and operated by the U.S. Department of Defense) with a determined starting point and by dead reckoning, inertial navigation measurements, altimeters, compasses, acoustic methods such as long baseline (lbl) and short baseline (sbl) acoustic positioning measurement methods, or any combination of such methods.

The data acquisition system 32 may further include the battery and the devices for measuring and recording the support data. The water vehicle 10 may also include an onboard communication unit 34, which may consist of one or more antennas for communicating data over specified distances.

Using Communication Systems with Water Vehicles

Figure 2:
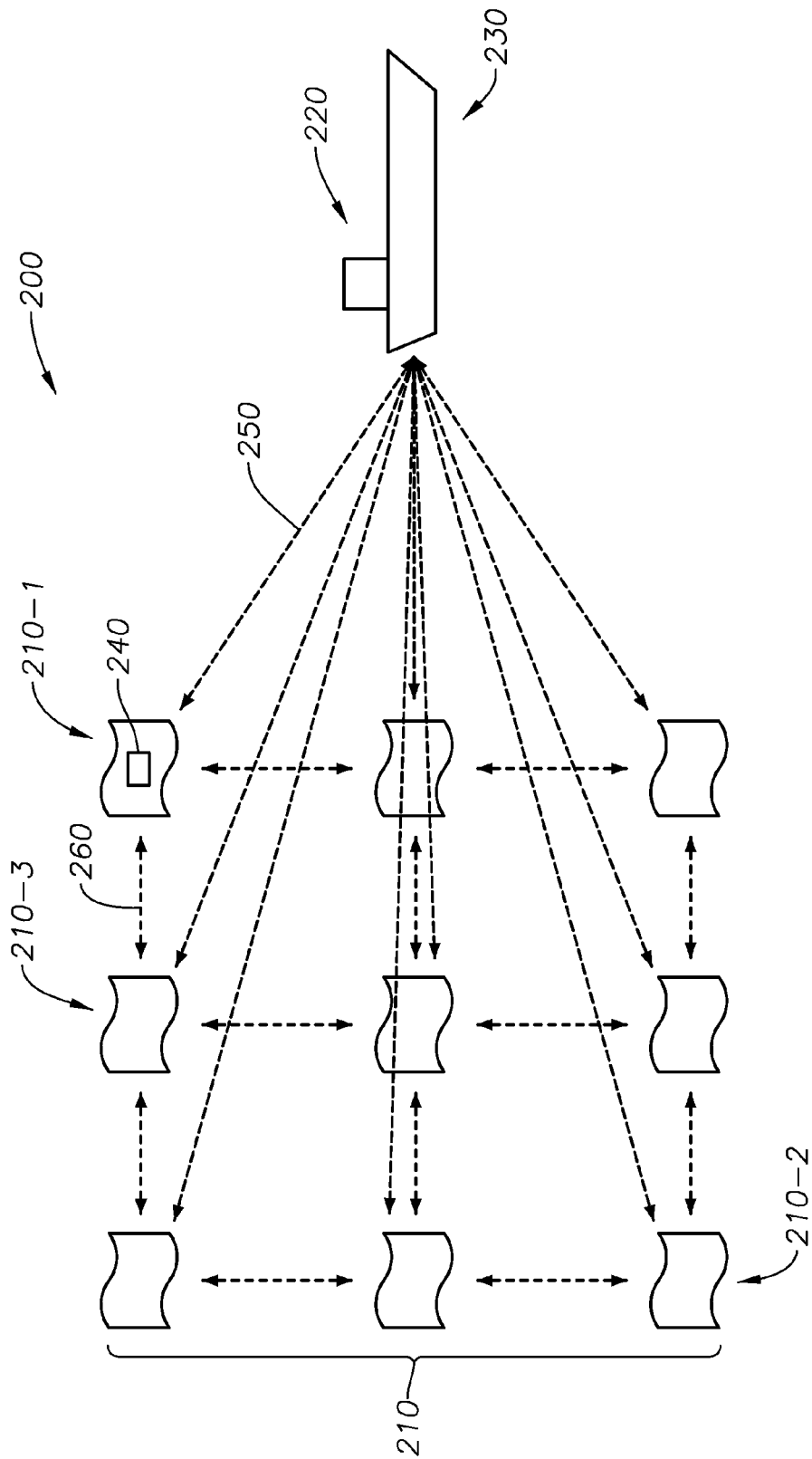
FIG. 2 illustrates a schematic diagram of a marine-based seismic acquisition system utilizing a network of one or more water vehicles in accordance with implementations of various techniques described herein.

FIG. 2 illustrates a schematic diagram of a marine-based seismic acquisition system 200 utilizing a network of water vehicles 210 in accordance with implementations of various techniques described herein. It should be understood that each water vehicle of the network of water vehicles 210 may be similar to the water vehicle 10 of FIG. 1.

FIG. 2 includes a central communication unit 220 located on a seismic source vessel 230. In some implementations, the central communication unit 220 may be located on the seismic source vessel 230, a service vessel, a platform, a land-based location or combinations thereof. The central communication unit 220 may be configured to receive seismic data and/or support data from the network of water vehicles 210 for further processing. The central communication unit 220 may also include a computer system and a storage system for storing the seismic data and/or the support data.

The central communication unit 220 may also be configured to transmit command data to the network of water vehicles 210. The command data may include any kind of command which could influence an operation of a water vehicle. For example, the command data may include an anti-collision command sent by the central communication unit 220. The command data may also include positioning command data for use in positioning the network of water vehicles 210 in a seismic survey area, as described in more detail below. In one implementation, the command data may be of a smaller data volume than the seismic data.

The marine-based seismic acquisition system 200 may use a long range communication system 250 and a medium range communication system 260 to transfer data among the network of water vehicles 210 and the central communication unit 220. In one implementation, the central communication unit 220 may use the long range communication system 250 to transmit the command data to the network of water vehicles 210. The long range communication system 250 may also be used to transmit the support data from the network of water vehicles 210 to the central communication unit 220. The support data and/or the command data may be transmitted continuously or at regular intervals. In some instances, the support data may be transmitted to the central communication unit 220 in real-time or near real-time. The command data may also be transmitted from the central communication unit 220 in real-time or near real-time.

In one implementation, the long range communication system 250 may be capable of transmitting data over a range of at least 10-20 kilometers. The long range communication system 250 may be implemented by any technology capable of transmitting data over this range, including, but not limited to, the Iridium satellite communications system, a long range radio link system or combinations thereof. The central communication unit 220 may use the long range communication system 250 to send the command data to, and receive support data from, the water vehicles 210 by communicating with the water vehicle's onboard communication unit 240.

In another implementation, a medium range communication system 260 may be used to transmit data within the network of water vehicles 210, including seismic data, command data, support data, or combinations thereof. Each water vehicle may send data to, and receive data from, those water vehicles which are in close enough proximity to communicate via the medium range communication system 260. For example, the medium range communication system 260 may allow for the direct transmission of data between water vehicles which are separated by a distance of less than 2 kilometers.

The medium range communication system 260 may be implemented by any technology capable of transmitting data over this range, including, but not limited to, Wi-Fi technology, Worldwide Interoperability for Microwave Access (WiMAX) technology, or combinations thereof. The medium range communication system 260 may also be implemented using an underwater communication system based on acoustic or optical methods, including, but not limited to, Sonardyne's Wideband acoustic communication system, Sonardyne's Bluecomm subsea optical communication system, or combinations thereof.

In operation, one water vehicle may use the medium range communication system 260 to send data to, and receive data from, another water vehicle via respective onboard communication units 240. In one implementation, the onboard communication unit 240 of each water vehicle may include separate equipment, such as radios or antennas, for each of the long range communication system 250 and the medium range communication system 260. Alternatively, each water vehicle may use the same equipment to access both the long range communication system 250 and the medium range communication system 260.

In an implementation where the network of water vehicles 210 is deployed in a line, each water vehicle may use the medium range communication system 260 to communicate with the water vehicles on either side of it. In an implementation where the network of water vehicles 210 is deployed in a grid, each water vehicle may use the medium range communication system 260 to communicate with its four nearest surrounding water vehicles. In a further implementation where the network of water vehicles 210 are deployed in a staggered grid, each water vehicle may use the medium range communication system 260 to communicate with its six nearest surrounding water vehicles.

In another implementation, in the network of water vehicles 210, a water vehicle 210-1 may want to send data to a water vehicle 210-2, but the two water vehicles may be separated by a distance such that use of the medium range communication system 260 is not possible. In such an implementation, the water vehicle 210-1 may send its data to the water vehicle 210-2 by relaying the data, via the medium range communication system 260, through one or more water vehicles in between the two water vehicles. For example, the water vehicle 210-1 may use the medium range communication system 260 to relay its seismic data through three water vehicles in the network of water vehicles 210 before the seismic data reaches the water vehicle 210-2.

Each water vehicle 210 may also transmit copies of its seismic data to one or more water vehicles of the network of water vehicles 210 for backup. In one implementation, a water vehicle may send copies of its seismic data to two adjacent water vehicles in the network of water vehicles 210. As an example, the water vehicle 210-1 may send a copy of its seismic data to another water vehicle 210-3 for storage on a storage system of the water vehicle 210-3, where the water vehicle 210-3 may be adjacent to the water vehicle 210-1. In another implementation, if the water vehicle 210-1 is in contact with only one adjacent water vehicle, the one adjacent water vehicle may then relay a copy of the seismic data to yet another water vehicle, i.e., a third water vehicle, for storage on a storage system of the third water vehicle to provide further redundancy. Each water vehicle may transmit copies of its seismic data continuously or at regular intervals.

In this manner, each water vehicle may receive copies of seismic data belonging to one or more adjacent water vehicles for storage on the water vehicle's storage system. For example, the water vehicle 210-1 may receive copies of seismic data belonging to two water vehicles in the network of water vehicles 210. In one implementation, over time, the water vehicle 210-1 may change which water vehicles may store copies of seismic data on a storage system of the water vehicle 210-1. In another implementation, if a water vehicle of the network of water vehicles 210 is found to be inoperable or is missing, then the seismic data and the backup seismic data stored on the inoperable or missing water vehicle will be backed up again on other water vehicles of the network. In some instances, a nearby water vehicle, an extra water vehicle, or a new water vehicle will be used to replace the inoperable or missing water vehicle.

In one implementation, the long range communication system 250 and/or the medium range communication system 260 may be used to position the network of water vehicles 210 within the seismic survey area. Prior to deployment in the seismic survey area, each water vehicle of the network of water vehicles 210 may be preprogrammed with an initial navigation plan unique to that water vehicle. The initial navigation plan may be used to optimally position a water vehicle and accompanying sensors to achieve certain seismic surveying objectives. The initial navigation plan may include geographical coordinates, Global Positioning System (GPS) positions, or any other implementation known to those skilled in the art.

Alternatively, each water vehicle may be programmed with the initial navigation plan unique to the water vehicle after the water vehicle has been deployed to the seismic survey area. For example, after being deployed to the seismic survey area, each water vehicle of the network of water vehicles 210 may receive respective positioning command data from the central communication unit 220 via the long range communication system 250, where the positioning command data for each water vehicle includes an initial navigation plan for the water vehicle. The initial navigation plan may be determined using a GNSS with a determined starting point and by dead reckoning, inertial navigation measurements, altimeters, compasses, acoustic methods such as long baseline (lbl) and short baseline (sbl) acoustic positioning measurement methods, or any combination of such methods.

As the network of water vehicles 210 move about the seismic survey area, the relative positions of each water vehicle with respect to the other water vehicles of the network of water vehicles may be monitored. The relative positions of each water vehicle with respect to the seismic source vessel 230 may also be monitored.

In one implementation, each water vehicle of the network of water vehicles 210 may have its position monitored using the central communication unit 220. For example, each water vehicle of the network of water vehicles 210 may send its positional data to the central communication unit 220 via the long range communication system 250 to allow the central communication unit 220 and/or an operator on the seismic source vessel 230 to monitor the water vehicle's relative position. The central communication unit 220 and/or the operator may also use the positional data to compare the water vehicle's relative position with respect to its initial navigation plan. In another example, the central communication unit 220 and/or the operator may monitor each water vehicle's relative position with respect to the other water vehicles, the seismic source vessel 230, and a respective initial navigation plan based on dead reckoning and acoustic methods such as long baseline (lbl) and short baseline (sbl) acoustic positioning measurement methods.

After monitoring the position of each water vehicle, the central communication unit 220 may transmit more positioning command data via the long range communication system 250 to each water vehicle, where the positioning command data for each water vehicle includes an updated navigation plan for the water vehicle. The updated navigation plan may be used to position or re-position a water vehicle in the seismic survey area, and may include geographical coordinates, Global Positioning System (GPS) positions, or any other implementation known to those skilled in the art. The updated navigation plan for each water vehicle may be based on a relative distance to other water vehicles and/or the seismic source vessel 230, a correction course needed for the water vehicle, changing seismic surveying objectives, or any other implementation known to those skilled in the art.

In another implementation, each water vehicle of the network of water vehicles 210 may monitor its own relative position with respect to the other water vehicles, the seismic source vessel 230, and its initial navigation plan based on dead reckoning and acoustic methods such as long baseline (lbl) and short baseline (sbl) acoustic positioning measurement methods. After monitoring its own position, each water vehicle may adjust its navigation plan based on a relative distance to other water vehicles and/or the seismic source vessel 230, a correction course needed for the water vehicle, changing seismic surveying objectives, or any other implementation known to those skilled in the art.

Figure 3:
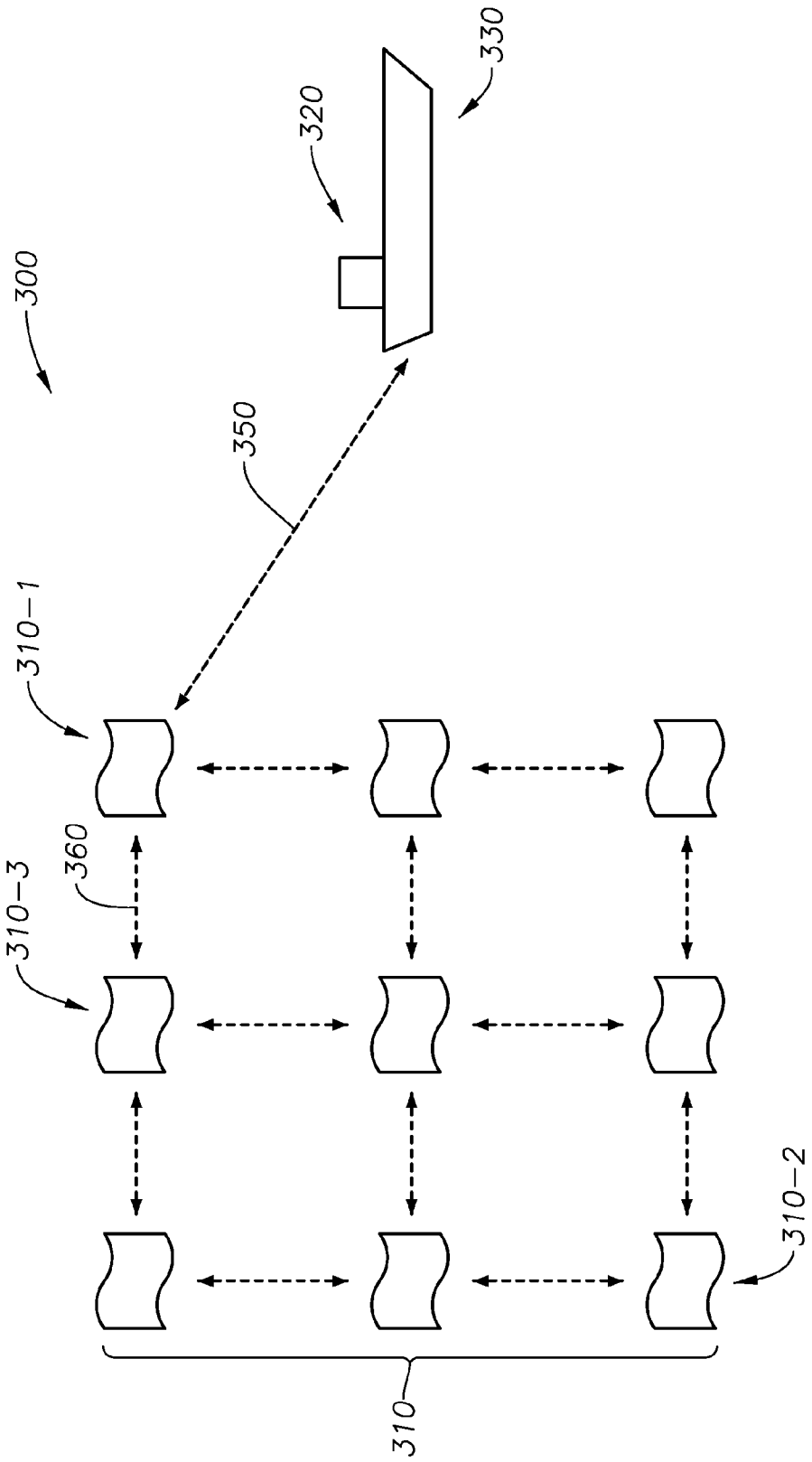
FIG. 3 illustrates a schematic diagram of a marine-based seismic acquisition system utilizing a network of water vehicles in accordance with implementations of various techniques described herein.

FIG. 3 illustrates a schematic diagram of a marine-based seismic acquisition system 300 utilizing a network of water vehicles 310 in accordance with implementations of various techniques described herein. It should be understood that the network of water vehicles 310 is similar to the network of water vehicles 210, central communication unit 320 is similar to central communication unit 220, seismic source vessel 330 is similar to seismic source vessel 230, long range communication system 350 is similar to the long range communication system 250, and medium range communication system 360 is similar to the medium range communication system 260.

As shown in FIG. 3, the marine-based seismic acquisition system 300 may use the long range communication system 350 to transmit command data from the central communication unit 320 to a water vehicle 310-1 of the network of water vehicles 310. In one implementation, the seismic source vessel 330 and the central communication unit 320 may be at least 10-20 kilometers away from the water vehicle 310-1. The water vehicle 310-1 may act like a hub for the remaining water vehicles of the network of water vehicles 310. For example, the central communication unit 320 may send the command data to the water vehicle 310-1 via the long range communication system 350, and the water vehicle 310-1 may then relay the command data to the water vehicle 310-2, via the medium range communication system 360, through one or more water vehicles in between the water vehicles 310-1 and 310-2.

The remaining water vehicles of the network of water vehicles 310 may send support data to the water vehicle 310-1, and the water vehicle 310-1 may then send the support data to the central communication unit 320. For example, the water vehicle 310-2 may relay its support data to the water vehicle 310-1, via the medium range communication system 360, through one or more water vehicles in between the water vehicles 310-1 and 310-2. The water vehicle 310-1 may then send the support data to the central communication unit 320 via the long range communication system 350.

The long range communication system 350 and/or the medium range communication system 360 may also be used to position the network of water vehicles 310 within the seismic survey area. In one implementation, prior to deployment in the seismic survey area, each water vehicle of the network of water vehicles 310 may be preprogrammed with an initial navigation plan unique to that water vehicle. In an alternate implementation, each water vehicle may be programmed with the initial navigation plan unique to the water vehicle after the water vehicle has been deployed to the seismic survey area. For example, the long range communication system 350 may transmit positioning command data from the central communication unit 320 to the water vehicle 310-1, where the positioning command data includes an initial navigation plan for the water vehicle 310-1. Further, the remaining water vehicles of the network of water vehicles 310 may use dead reckoning and/or acoustic methods, such as long baseline (lbl) and short baseline (sbl) acoustic positioning measurement methods, to position the remaining water vehicles relative to the water vehicle 310-1.

In another implementation, the central communication unit 320 may transmit positioning command data to the network of water vehicles 310 by relaying the positioning command data via the water vehicle 310-1. For example, the long range communication system 350 may transmit positioning command data for water vehicle 310-2 from the central communication unit 320 to the water vehicle 310-1, and the water vehicle 310-1 may then relay the positioning command data for water vehicle 310-2 to the water vehicle 310-2, via the medium range communication system 360, through one or more water vehicles in between the water vehicles 310-1 and 310-2. In such an example, the positioning command data for water vehicle 310-2 may include an initial navigation plan for the water vehicle 310-2.

In a further implementation, each water vehicle of the network of water vehicles 310 may have its position monitored using the central communication unit 320. For example, water vehicle 310-1 may send its positional data to the central communication unit 320 via the long range communication system 350 to allow the central communication unit 320 and/or an operator on the seismic source vessel to monitor the relative position of the water vehicle 310-1. Further, each remaining water vehicle of the network of water vehicles 310, such as water vehicle 310-2, may relay its positional data to the water vehicle 310-1 through one or more water vehicles via the medium range communication system 360. The water vehicle 310-1 may then send the positional data of each remaining water vehicle to the central communication unit 320 via the long range communication system 350. In another implementation, the central communication unit 320 and/or the operator may monitor each water vehicle's relative position with respect to the other water vehicles, the seismic source vessel 330, and a respective initial navigation plan based on dead reckoning and/or acoustic methods such as long baseline (lbl) and short baseline (sbl) acoustic positioning measurement methods.

In one implementation, after monitoring the position of each water vehicle of the network of water vehicles 310, the central communication unit 320 may transmit additional positioning command data to the network of water vehicles 310, where the positioning command data for each water vehicle includes an updated navigation plan for the water vehicle. The updated navigation plan for each water vehicle may be based on a relative distance to other water vehicles and/or the seismic source vessel 330, a correction course needed for the water vehicle, changing seismic surveying objectives, or any other implementation known to those skilled in the art.

For example, the long range communication system 350 may transmit additional positioning command data from the central communication unit 320 to the water vehicle 310-1, where the positioning command data includes an updated navigation plan for the water vehicle 310-1. The remaining water vehicles of the network of water vehicles 310 may then use dead reckoning and/or acoustic methods, such as long baseline (lbl) and short baseline (sbl) acoustic positioning measurement methods, to position the remaining water vehicles relative to the water vehicle 310-1.

In another example, the central communication unit 320 may transmit additional positioning command data to the network of water vehicles 310 by relaying the positioning command data via the water vehicle 310-1. For instance, the long range communication system 350 may transmit additional positioning command data for water vehicle 310-2 from the central communication unit 320 to the water vehicle 310-1, and the water vehicle 310-1 may then relay the positioning command data to the water vehicle 310-2, via the medium range communication system 360, through one or more water vehicles in between the water vehicles 310-1 and 310-2. The additional positioning command data for the water vehicle 310-2 may include an updated navigation plan for the water vehicle 310-2.

Figure 4:
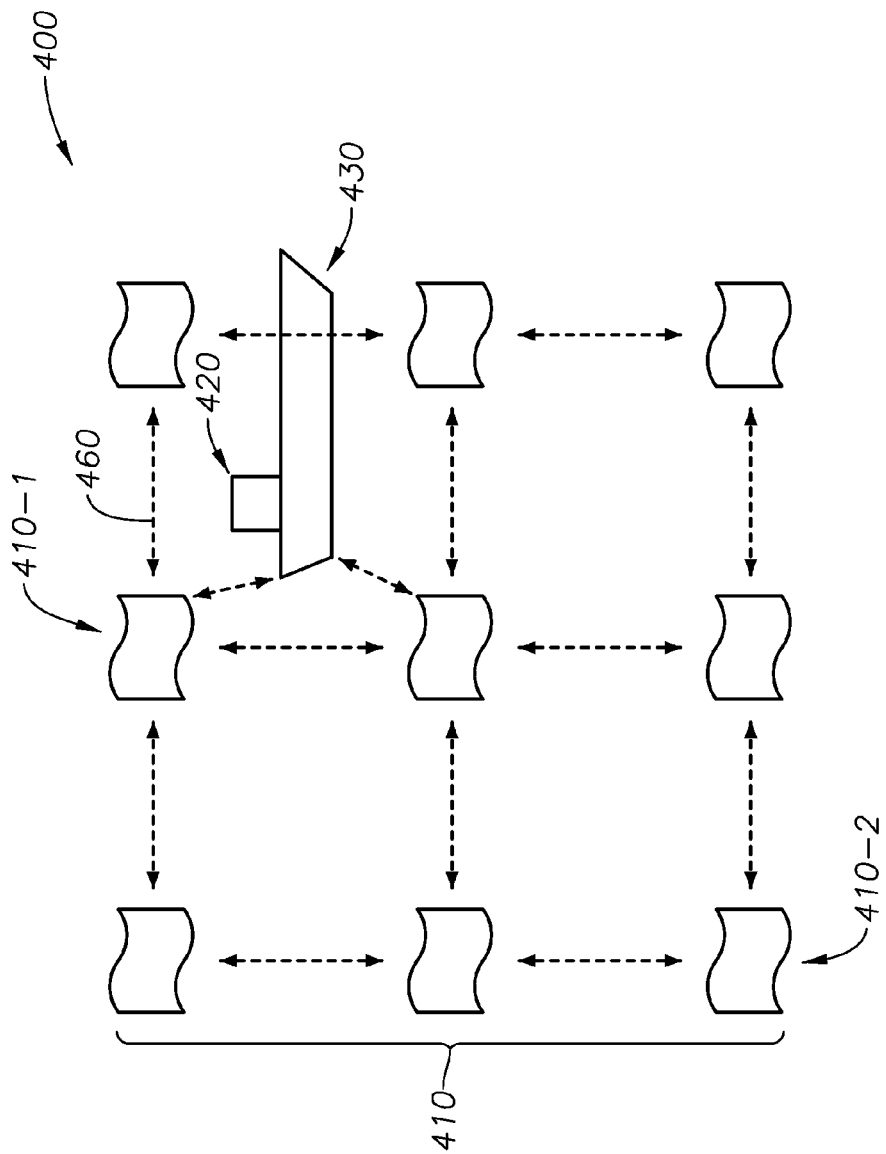
FIG. 4 illustrates a schematic diagram of a marine-based seismic acquisition system utilizing a network of water vehicles in accordance with implementations of various techniques described herein.

FIG. 4 illustrates a schematic diagram of a marine-based seismic acquisition system 400 utilizing a network of water vehicles 410 in accordance with implementations of various techniques described herein. It should be understood that the network of water vehicles 410 is similar to the network of water vehicles 210, central communication unit 420 is similar to central communication unit 220, seismic source vessel 430 is similar to seismic source vessel 230, long range communication system 450 is similar to the long range communication system 250, and medium range communication system 460 is similar to the medium range communication system 260.

As shown in FIG. 4, the seismic source vessel 430 has navigated to the network of water vehicles 410 such that the central communication unit 420 may be within the range of the medium range communication system 460 for at least one water vehicle of the network of water vehicles 410. For instance, the seismic source vessel 430 may be less than two kilometers away from the water vehicle 410-1. As such, the central communication unit 420 may receive seismic data from at least one water vehicle via the medium range communication system 460. In some instances, the seismic data may have just been acquired in real-time or near real-time, or the seismic data may have been previously acquired and stored on the water vehicle. The central communication unit 420 may also send command data to, and receive support data from, at least one water vehicle via the medium range communication system 460.

In one implementation, data can be relayed between the at least one water vehicle and the central communication unit 420 using the water vehicles in between the two. For example, the water vehicle 410-2 may relay its seismic data and support data to the central communication unit 420, via the medium range communication system 460, through one or more water vehicles in between the water vehicle 410-2 and the central communication unit 420.

In another implementation, the medium range communication system 460 may also be used to position the network of water vehicles 410 within the seismic survey area. For example, the medium range communication system 460 may transmit positioning command data from the central communication unit 420 to the water vehicle 410-1, where the positioning command data includes an initial navigation plan for the water vehicle 410-1. Further, the remaining water vehicles of the network of water vehicles 410 may use dead reckoning and/or acoustic methods, such as long baseline (lbl) and short baseline (sbl) acoustic positioning measurement methods, to position the remaining water vehicles relative to the water vehicle 410-1 and/or the seismic source vessel 430.

In another implementation, the central communication unit 420 may transmit positioning command data to the network of water vehicles 410 by relaying the positioning command data. For example, the central communication unit 420 may transmit positioning command data to water vehicle 410-2 by relaying the positioning command data, via the medium range communication system 460, through one or more water vehicles in between the water vehicle 410-2 and the central communication unit 420. In such an example, the positioning command data may include an initial navigation plan for the water vehicle 410-2.

In a further implementation, each water vehicle of the network of water vehicles 410 may have its position monitored using the central communication unit 420. For example, water vehicle 410-1 may send its positional data to the central communication unit 420 via the medium range communication system 460 to allow the central communication unit 420 and/or an operator on the seismic source vessel to monitor the relative position of the water vehicle 410-1. Further, each remaining water vehicle of the network of water vehicles 410, such as water vehicle 410-2, may relay its positional data to the central communication unit 420, via the medium range communication system 460, through one or more water vehicles in between the water vehicles and the central communication unit 420. In another implementation, the central communication unit 420 and/or the operator may monitor each water vehicle's relative position with respect to the other water vehicles, the seismic source vessel 430, and a respective initial navigation plan based on dead reckoning and/or acoustic methods such as long baseline (lbl) and short baseline (sbl) acoustic positioning measurement methods.

In one implementation, after monitoring the position of each water vehicle of the network of water vehicles 410, the central communication unit 420 may transmit additional positioning command data to the network of water vehicles 410 via the medium range communication system 460, where the positioning command data for each water vehicle includes an updated navigation plan for the water vehicle. For example, the central communication unit 420 may transmit additional positioning command data from the central communication unit 420 to the water vehicle 410-1 via the medium range communication system 460, where the positioning command data includes an updated navigation plan for the water vehicle 410-1. The remaining water vehicles of the network of water vehicles 410 may then use dead reckoning and/or acoustic methods, such as long baseline (lbl) and short baseline (sbl) acoustic positioning measurement methods, to position the remaining water vehicles relative to the water vehicle 410-1.

In another example, the central communication unit 420 may transmit additional positioning command data to the network of water vehicles 410 by relaying the positioning command data via the medium range communication system 460. For instance, the central communication unit 420 may transmit additional positioning command data to water vehicle 410-2 by relaying the positioning command data, via the medium range communication system 460, through one or more water vehicles in between the water vehicle 410-2 and the central communication unit 420. In such an example, the additional positioning command data may include an updated navigation plan for the water vehicle 410-2.

Figure 5:
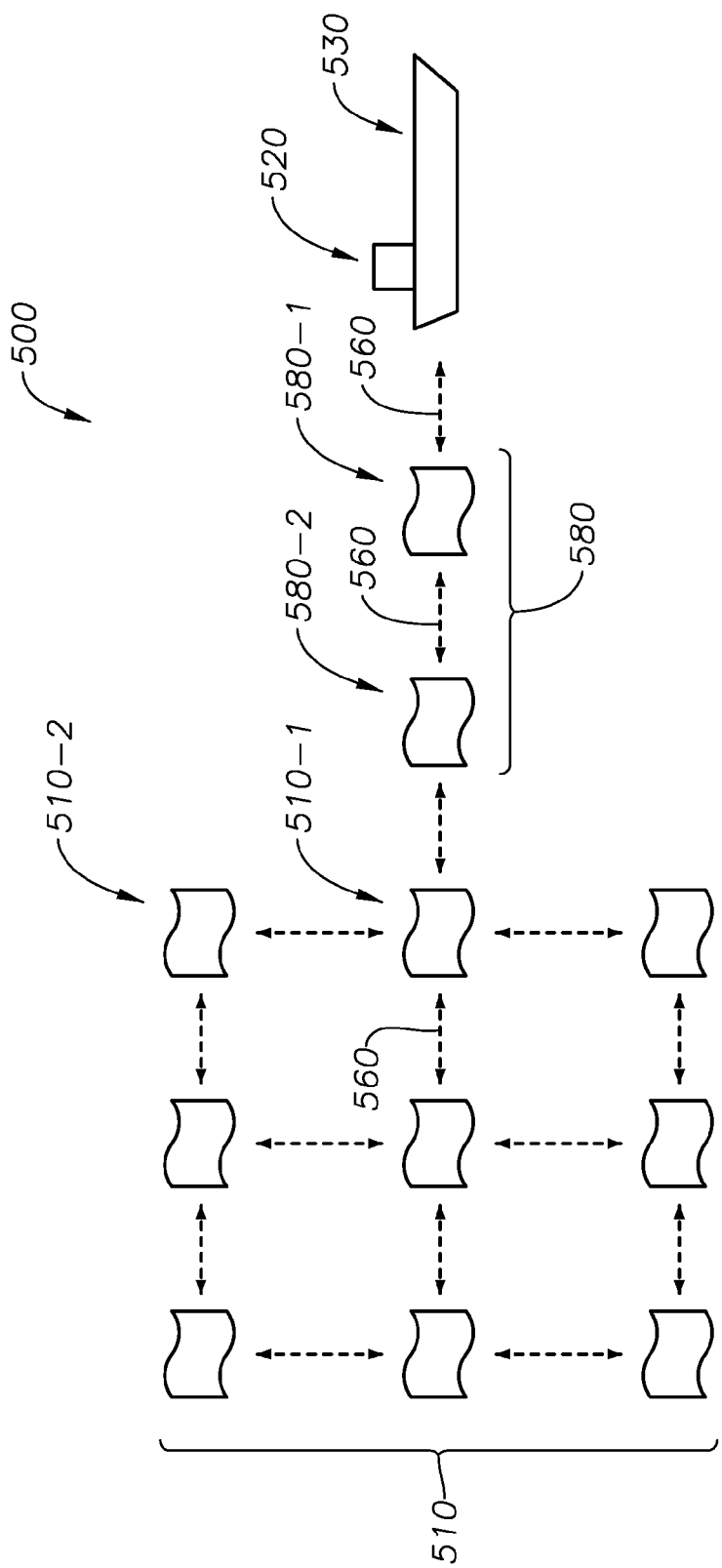
FIG. 5 illustrates a schematic diagram of a marine-based seismic acquisition system utilizing a network of water vehicles in accordance with implementations of various techniques described herein.

FIG. 5 includes a similar configuration to FIG. 4, where FIG. 5 illustrates a schematic diagram of a marine-based seismic acquisition system 500 utilizing a network of water vehicles 510 in accordance with implementations of various techniques described herein. It should be understood that the network of water vehicles 510 is similar to the network of water vehicles 210, central communication unit 520 is similar to central communication unit 220, seismic source vessel 530 is similar to seismic source vessel 230 and medium range communication system 560 is similar to the medium range communication system 260. FIG. 5 also includes relay water vehicles 580. The relay water vehicles 580 may be constructed similarly to water vehicles 510 and may be spares that are otherwise idle. Alternatively the relay water vehicles 580 may not have sensors or may not be used to sample seismic data. In one implementation, the relay water vehicles 580 may be used to acquire environmental data from collection units, such as Acoustic Doppler Current Profilers (ADCPs), bathymetric measurement units, marine mammal detection units or combinations thereof.

As shown in FIG. 5, the seismic source vessel 530 has navigated such that the central communication unit 520 may be within the range of the medium range communication system 560 for at least some of the relay water vehicles 580. For instance, the seismic source vessel 530 may be less than two kilometers away from the relay water vehicle 580-1. As such, in one implementation, data can be relayed between one water vehicle 510 and the central communication unit 520 via the medium range communication system 560 using the relay water vehicles 580.

For example, water vehicle 510-2 may relay its seismic data and support data to relay water vehicle 580-1, via the medium range communication system 560, through water vehicle 510-1 and relay water vehicle 580-2. The relay water vehicle 580-1 may then send the seismic data and the support data to the central communication unit 520 using the medium range communication system 560. In some instances, the seismic data and the support data may be sent to the central communication unit 520 in real-time or near real-time.

In another implementation, the medium range communication system 560 may also be used to position the network of water vehicles 510 within the seismic survey area. For example, the medium range communication system 560 may transmit positioning command data from the central communication unit 520 to the water vehicle 510-2, where the positioning command data includes an initial navigation plan for the water vehicle 510-2, by relaying the positioning command data via the medium range communication system 560 through water vehicle 510-1, relay water vehicle 580-2, and relay water vehicle 580-2. Further, the remaining water vehicles of the network of water vehicles 510 may use dead reckoning and/or acoustic methods, such as long baseline (lbl) and short baseline (sbl) acoustic positioning measurement methods, to position the remaining water vehicles relative to the water vehicle 510-2 and/or the seismic source vessel 530.

In a further implementation, each water vehicle of the network of water vehicles 510 may have its position monitored using the central communication unit 520. For example, water vehicle 510-1 may send its positional data to the central communication unit 520, via the medium range communication system 560, to allow the central communication unit 520 and/or an operator on the seismic source vessel to monitor the relative position of the water vehicle 510-1. The water vehicle 510-1 may transmit its positional data to the central communication unit 520 by relaying its positional data, via the medium range communication system 560, through one or more relay water vehicles in between the water vehicle 510-1 and the central communication unit 520.

In one implementation, after monitoring the position of each water vehicle of the network of water vehicles 510, the central communication unit 520 may transmit additional positioning command data to the network of water vehicles 510, where the positioning command data for each water vehicle includes an updated navigation plan for the water vehicle. For example, the medium range communication system 560 may transmit additional positioning command data from the central communication unit 520 to the water vehicle 510-2, where the positioning command data includes an updated navigation plan for the water vehicle 510-2, by relaying the positioning command data via the medium range communication system 560 through water vehicle 510-1, relay water vehicle 580-2, and relay water vehicle 580-2. In a further implementation, the remaining water vehicles of the network of water vehicles 410 may then use dead reckoning and/or acoustic methods, such as long baseline (lbl) and short baseline (sbl) acoustic positioning measurement methods, to position the remaining water vehicles relative to the water vehicle 510-2.

Figure 6:
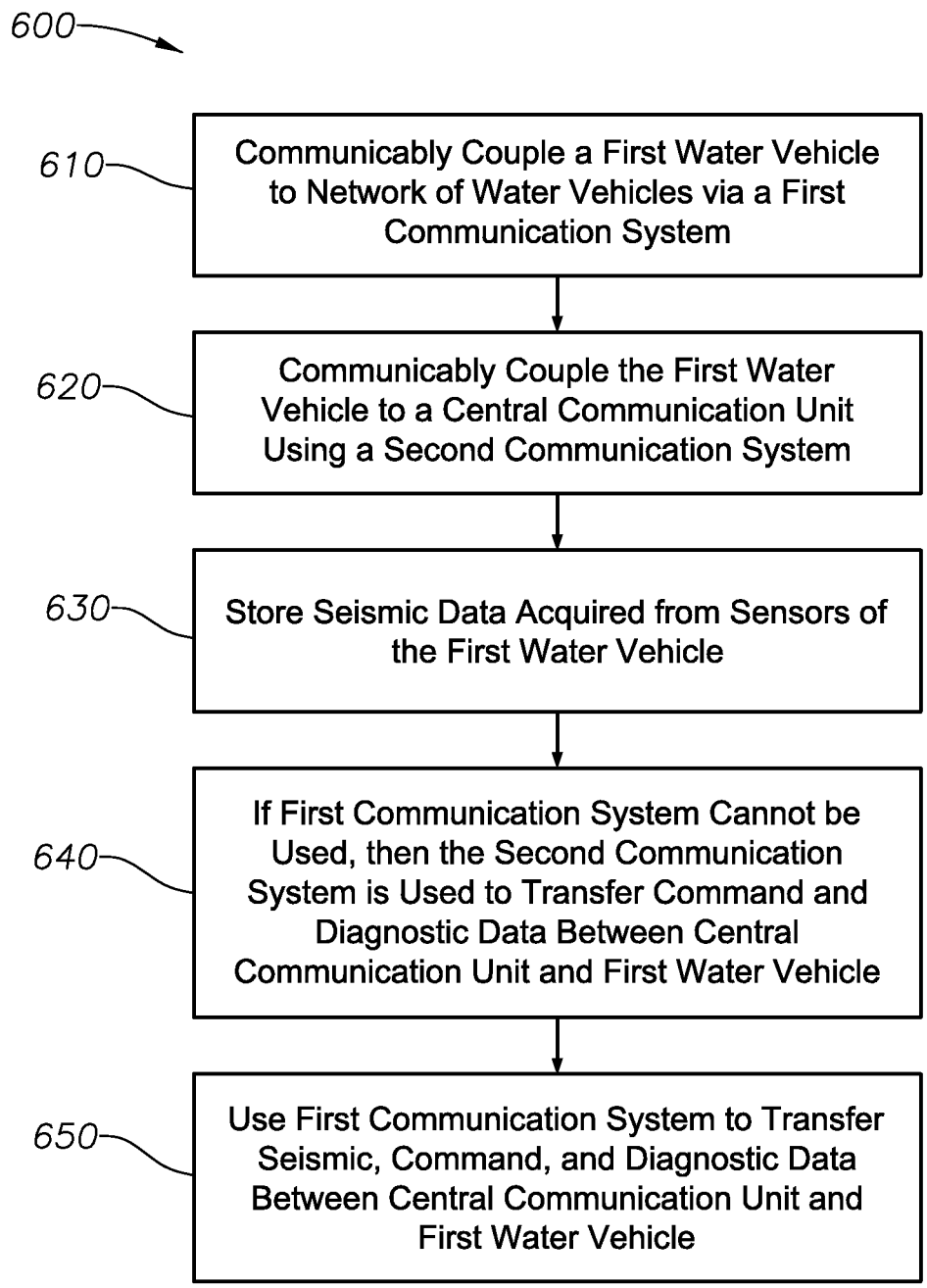
FIG. 6 illustrates a flow diagram of a method for communicating with water vehicles in a marine-based seismic acquisition system in accordance with implementations of various techniques described herein.

FIG. 6 illustrates a flow diagram of a method 600 for communicating with water vehicles in a marine-based seismic acquisition system in accordance with implementations of various techniques described herein. It should be understood that while method 600 indicates a particular order of execution of operations, in some implementations, certain portions of the operations might be executed in a different order.

At block 610, a first water vehicle may be communicably coupled to one or more water vehicles of a network of water vehicles via a first communication system. In one implementation, the first communication system includes the medium range communication system discussed above with reference to FIGS. 1-5.

At block 620, the first water vehicle may be communicably coupled to a central communication unit using a second communication system. In one implementation, the second communication system includes the long range communication system discussed above with reference to FIGS. 1-5.

At block 630, the first water vehicle may store seismic data acquired from its sensors. The sensors and storage may be arranged as discussed above with reference to FIG. 1.

At block 640, if the central communication unit is at a distance from the first water vehicle such that the first communication system cannot be used, then the central communication unit may send command data to the first water vehicle via the second communication system. In this implementation, the first water vehicle may send its support data to the central communication system via the second communication system. The second communication system may transfer command data and support data as discussed above with respect to FIGS. 1-5.

At block 650, if the central communication unit is at a distance from the first water vehicle such that the first communication system can be used, then the central communication unit sends command data to the first water vehicle via the first communication system. In addition, the first water vehicle sends its seismic data and support data to the central communication system via the first communication system. The first communication system may transfer seismic, command data, and support data as discussed above with respect to FIGS. 1-5.

For some implementations of FIGS. 2-6, the higher bandwidth and shorter range requirements of the medium range communication system may allow for more efficient transfer of seismic data to the central communication unit than if the long range communication system were used to transfer seismic data from the water vehicles. For example, due to the volume size of acquired seismic data, relaying the seismic data from the water vehicle to the central communication unit via Wi-Fi technology may be more power efficient than the water vehicle sending the seismic data to the central communication unit via satellite. In some instances, support data and command data may be efficiently transferred via the long range communication system due to their relatively lower data volumes.

The implementations of various techniques described herein may also be implemented using land-based AOVs, ROVs, central communication units, seismic sensors, stationary seismic sensors and other implementations known to those skilled in the art.

Computing System

Figure 7:
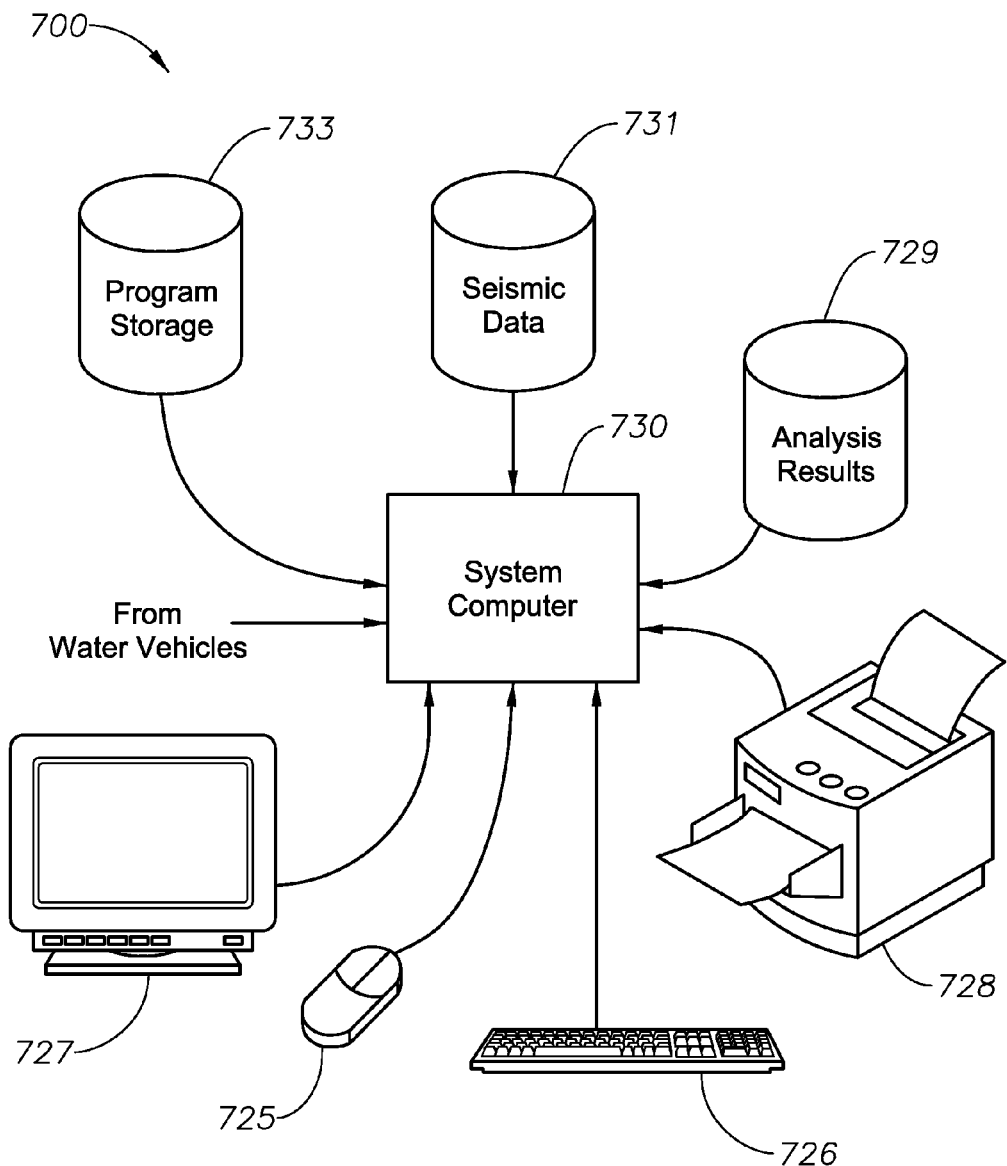
FIG. 7 illustrates an example computing system in accordance with implementations of various techniques described herein.

FIG. 7 illustrates a computing system 700, into which implementations of various techniques described herein may be implemented. The computing system 700 (system computer) may include one or more system computers 730, which may be implemented as any conventional personal computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 730 may be in communication with disk storage devices 729, 731 and 733, which may be external hard disk storage devices. It is contemplated that disk storage devices 729, 731 and 733 are conventional hard disk drives, and as such, will be implemented by way of a local area network or by remote access. Of course, while disk storage devices 729, 731, and 733 are illustrated as separate devices, a single disk storage device may be used to store any and all of the program instructions, measurement data, and results as desired.

In one implementation, seismic data from the sensors may be stored in disk storage device 731. The system computer 730 may retrieve the appropriate data from the disk storage device 731 to process seismic data according to program instructions that correspond to implementations of various techniques described herein. The program instructions may be written in a computer programming language, such as C++, Java and the like. The program instructions may be stored in a computer-readable medium, such as program disk storage device 733. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 730. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 730 may present output primarily onto graphics display 727, or alternatively via printer 728. The system computer 730 may store the results of the methods described above on disk storage 729, for later use and further analysis. The keyboard 726 and the pointing device (e.g., a mouse, trackball, or the like) 725 may be provided with the system computer 730 to enable interactive operation.

The system computer 730 may be located at a data center remote from the survey region. The system computer 730 may be in communication with the receivers (either directly or via a recording unit, not shown), to receive signals indicative of the reflected seismic energy. These signals, after conventional formatting and other initial processing, may be stored by the system computer 730 as digital data in the disk storage 731 for subsequent retrieval and processing in the manner described above. In one implementation, these signals and data may be sent to the system computer 730 directly from sensors, such as geophones, hydrophones and the like. When receiving data directly from the sensors, the system computer 730 may be described as part of an in-field data processing system. In another implementation, the system computer 730 may process seismic data already stored in the disk storage 731. When processing data stored in the disk storage 731, the system computer 730 may be described as part of a remote data processing center, separate from data acquisition. The system computer 730 may be configured to process data as part of the in-field data processing system, the remote data processing system or a combination thereof. While FIG. 7 illustrates the disk storage 731 as directly connected to the system computer 730, it is also contemplated that the disk storage device 731 may be accessible through a local area network or by remote access. Furthermore, while disk storage devices 729, 731 are illustrated as separate devices for storing input seismic data and analysis results, the disk storage devices 729, 731 may be implemented within a single disk drive (either together with or separately from program disk storage device 733), or in any other conventional manner as will be fully understood by one of skill in the art having reference to this specification.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of performing a seismic survey, comprising:
   deploying a plurality of wave gliders in a seismic survey area, wherein the plurality of wave gliders has one or more seismic sensors coupled thereto for acquiring seismic data, wherein the plurality of wave gliders are unmanned and each operate independently of one another;
   deploying at least one source vessel in the seismic survey area, the at least one source vessel having one or more sources coupled thereto and a central communication unit disposed thereon;
   sending positioning data from the central communication unit to a first wave glider of the plurality of wave gliders via a first communication system; and
   sending the positioning data from the first wave glider to a second wave glider of the plurality of wave gliders by relaying the positioning data through one or more of the plurality of wave gliders disposed between the first wave glider and the second wave glider, wherein the positioning data is sent from the first wave glider to the second glider via a second communication system different from the first communication system.

2. The method of claim 1, wherein the positioning data comprise a respective navigation plan for each wave glider.

3. The method of claim 1, wherein
   the positioning data comprises a navigation plan; and further comprising:
   positioning the second wave glider according to the navigation plan.

4. The method of claim 1, further comprising using the central communication unit to monitor the relative position of each wave glider in the plurality of wave gliders with respect to other wave gliders of the plurality of wave gliders and with respect to the at least one source vessel.

5. The method of claim 4, wherein using the central communication unit to monitor the relative position of each wave glider comprises sending positional data from each wave glider to the central communication unit.

6. The method of claim 5, wherein the positional data comprises data derived from a Global Navigation Satellite System (GNSS), dead reckoning, an inertial navigation measurement, an altimeter, a compass, a long baseline measurement method, a short baseline measurement method, or combinations thereof.

7. The method of claim 4, wherein using the central communication unit to monitor the relative position of each wave glider comprises:
   sending the positional data from the second wave glider to the central communication unit.

8. The method of claim 7,
   wherein the positioning data comprises an updated navigation plan;
   sending the positioning data from the first wave glider to the second wave glider by relaying the positioning data through the one or more wave gliders disposed between the first wave glider and the second wave glider; and
   positioning the second wave glider according to the updated navigation plan.

9. The method of claim 4, further comprising:
   sending positional data from the first wave glider of the plurality of wave gliders to the central communication unit;
   sending positioning data from the central communication unit to the first wave glider based on the positional data, wherein the positioning data comprises an updated navigation plan; and
   positioning the first wave glider according to the updated navigation plan.

10. The method of claim 1, further comprising each wave glider determining its relative position with respect to the other wave gliders of the plurality of wave gliders and with respect to the at least one source vessel.

11. The method of claim 10, wherein the relative position of each wave glider is determined using dead reckoning, an inertial navigation measurement, an altimeter, a compass, a long baseline measurement method, a short baseline measurement method, or combinations thereof.

12. The method of claim 10, further comprising:
   upon determining its relative position, each wave glider creating a respective updated navigation plan; and
   positioning each wave glider according to the respective updated navigation plan.

13. A method of performing a seismic survey, comprising:
   deploying a plurality of unmanned water vehicles in a seismic survey area, wherein a first unmanned water vehicle of the plurality of unmanned water vehicles includes one or more seismic sensors for acquiring seismic data;
   communicably coupling the first unmanned water vehicle to one or more remaining unmanned water vehicles of the plurality of unmanned water vehicles using a first communication system;
   communicably coupling a central communication unit disposed on a source vessel to the plurality of unmanned water vehicles using a second communication system, wherein the second communication system has a greater range than the first communication system, and wherein the second communication system comprises a satellite communication system;

sending first positioning command data from the central communication unit to the first unmanned water vehicle via the second communication system; and sending the first positioning command data from the first unmanned water vehicle to a second unmanned water vehicle of the plurality of unmanned water vehicles by relaying the first positioning command data through one or more of the plurality of unmanned water vehicles disposed between the first unmanned water vehicle and the second unmanned water vehicle via the first communication system.

14. The method of claim 13, further comprising sending support data from the plurality of unmanned water vehicles to the central communication unit to via the second communication system.

15. The method of claim 13, further comprising:

sending support data from the second unmanned water vehicle to the first unmanned water vehicle by relaying the support data through the one or more of the plurality of unmanned water vehicles disposed between the first unmanned water vehicle and the second unmanned water vehicle via the first communication system; and sending the support data from the first unmanned water vehicle to the central communication unit via the second communication system.

16. The method of claim 13, further comprising:

deploying the source vessel proximate to the first unmanned water vehicle;

sending second positioning command data from the central communication unit to the first unmanned water vehicle via the first communication system; and sending support data from the first water vehicle to the central communication unit to via the first communication system.

17. The method of claim 16, further comprising:

sending the second positioning command data from the first unmanned water vehicle to the second unmanned water vehicle of the plurality of unmanned water vehicles by relaying the second positioning command data through the one or more of the plurality of unmanned water vehicles disposed between the first unmanned water vehicle and the second unmanned water vehicle via the first communication system; and sending the support data from the second unmanned water vehicle to the first unmanned water vehicle by relaying the support data through the one or more of the plurality of unmanned water vehicles disposed between the first unmanned water vehicle and the second unmanned water vehicle via the first communication system.

18. A method of performing a seismic survey, comprising:

deploying a plurality of unmanned water vehicles configured to operate on a water surface in a seismic survey area, the plurality of unmanned water vehicles having one or more seismic sensors coupled thereto for acquiring seismic data;

deploying at least one vessel in the seismic survey area, the at least one vessel having a central communication unit disposed thereon;

sending command data to a first unmanned water vehicle of the plurality of unmanned water vehicles from the central communication unit via a long range communication system; and sending the command data from the first unmanned water vehicle to a second unmanned water vehicle of the plurality of unmanned water vehicles by relaying the command data through one or more of the plurality of unmanned water vehicles disposed between the first unmanned water vehicle and the second unmanned water vehicle via a medium range communication system, wherein the medium range communication system is configured to have a higher bandwidth than the long range communication system.

19. The method of claim 18, further comprising:

sending support data from the second unmanned water vehicle to the first unmanned water vehicle by relaying the support data through one or more of the plurality of unmanned water vehicles in between the first unmanned water vehicle and the second unmanned water vehicle; and sending the support data from the first unmanned water vehicle to the central communication unit.

20. The method of claim 18, further comprising positioning the second unmanned water vehicle based on the command data.

21. The method of claim 18, wherein the medium range communication system comprises a Wi-Fi technology system, Worldwide Interoperability for Microwave Access (WiMAX) technology system, an underwater communication system, or combinations thereof.

* * * * *